United States Patent
Yuasa et al.

(10) Patent No.: US 10,677,660 B2
(45) Date of Patent: Jun. 9, 2020

(54) TEMPERATURE TRACEABLE INDICATOR AND METHOD FOR MANUFACTURING SAME

(71) Applicant: Hitachi Industrial Equipment Systems Co., Ltd., Chiyoda-ku, Tokyo (JP)

(72) Inventors: Toyotaka Yuasa, Tokyo (JP); Hiroyuki Kagawa, Tokyo (JP); Hiroshi Sasaki, Tokyo (JP); Kenichi Souma, Tokyo (JP)

(73) Assignee: Hitachi Industrial Equipment Systems Co., Ltd., Tokyo (JP)

( * ) Notice: Subject to any disclaimer, the term of this patent is extended or adjusted under 35 U.S.C. 154(b) by 431 days.

(21) Appl. No.: 15/554,105

(22) PCT Filed: Jan. 29, 2016

(86) PCT No.: PCT/JP2016/052557
§ 371 (c)(1),
(2) Date: Aug. 28, 2017

(87) PCT Pub. No.: WO2016/157977
PCT Pub. Date: Oct. 6, 2016

(65) Prior Publication Data
US 2018/0045582 A1 Feb. 15, 2018

(30) Foreign Application Priority Data
Mar. 30, 2015 (JP) .................. 2015-067902

(51) Int. Cl.
*G01K 11/16* (2006.01)
*G01K 11/06* (2006.01)
(Continued)

(52) U.S. Cl.
CPC .............. *G01K 11/16* (2013.01); *C09D 11/50* (2013.01); *C09K 3/00* (2013.01); *G01K 11/06* (2013.01);
(Continued)

(58) Field of Classification Search
CPC .......... G01K 11/16; G01K 11/06; C09K 3/00; C09D 11/50; G09F 3/02; G09F 2003/0211; B32B 2307/4026; B32B 2307/30
See application file for complete search history.

(56) References Cited

U.S. PATENT DOCUMENTS

RE25,499 E * 12/1963 Fenity et al. ........... G01W 1/00
                                                                 116/201
3,736,899 A * 6/1973 Manske ............... B65D 79/005
                                                                 116/270
(Continued)

FOREIGN PATENT DOCUMENTS

EP     0 112 023 A2   6/1984
JP     52-56585 A     5/1977
(Continued)

OTHER PUBLICATIONS

Extended European Search Report issued in counterpart European Application No. 16771861.8 dated Oct. 25, 2018 (nine (9) pages).
(Continued)

*Primary Examiner* — Nimeshkumar D Patel
*Assistant Examiner* — Tania Courson
(74) *Attorney, Agent, or Firm* — Crowell & Moring LLP (57) ABSTRACT

The purpose of the present invention is to provide a temperature traceable indicator capable not only of displaying temperature history, but also adding other additional information. To that end, a temperature traceable indicator according to the present invention is provided with a base
(Continued)

material and a temperature indicating laminate disposed on the base material, and is characterized in that the temperature indicating laminate is provided with a coloring layer including a color former, a color developing layer including a color developer for inducing the coloration of the color former, and a barrier layer disposed between the coloring layer and color developing layer, and the barrier layer includes a barrier agent that is immiscible with the color developer, is frozen at a first temperature, and melts beyond a second temperature so as to allow the color developer to become diffused in the coloring layer so that color is produced.

13 Claims, 9 Drawing Sheets

(51) Int. Cl.
  *G09F 3/02* (2006.01)
  *C09K 3/00* (2006.01)
  *C09D 11/50* (2014.01)
(52) U.S. Cl.
  CPC ............ *G09F 3/02* (2013.01); *B32B 2307/30* (2013.01); *B32B 2307/4026* (2013.01); *G09F 2003/0211* (2013.01)

(56) References Cited

U.S. PATENT DOCUMENTS

| | | | | | |
|---|---|---|---|---|---|
| 3,954,011 | A | * | 5/1976 | Manske | G01K 3/04 374/102 |
| 3,962,920 | A | * | 6/1976 | Manske | G01K 3/04 374/102 |
| 3,967,579 | A | | 7/1976 | Seiter | |
| 3,999,946 | A | * | 12/1976 | Patel | G01N 31/229 422/400 |
| 4,057,029 | A | | 11/1977 | Seiter | |
| 4,439,346 | A | * | 3/1984 | Patel | G01K 11/16 116/202 |
| 4,457,252 | A | * | 7/1984 | Manske | G01K 11/06 116/216 |
| 4,732,930 | A | * | 3/1988 | Tanaka | C08F 8/00 524/555 |
| 4,793,717 | A | * | 12/1988 | Manske | G01K 3/00 116/219 |
| 5,057,434 | A | * | 10/1991 | Prusik | B65D 79/02 116/207 |
| 5,215,378 | A | * | 6/1993 | Manske | G01K 3/00 116/216 |
| 5,336,057 | A | * | 8/1994 | Fukuda | F04B 43/043 222/386.5 |
| 5,622,137 | A | * | 4/1997 | Lupton, Jr. | G01K 11/16 116/217 |
| 5,709,472 | A | * | 1/1998 | Prusik | G01K 3/04 116/219 |
| 5,756,356 | A | * | 5/1998 | Yanagi | G01N 31/229 436/7 |
| 6,042,264 | A | * | 3/2000 | Prusik | G01K 3/04 116/219 |
| 6,472,214 | B2 | * | 10/2002 | Patel | G01N 31/229 422/424 |
| 6,524,000 | B1 | * | 2/2003 | Roth | B41M 3/14 116/206 |
| 6,544,925 | B1 | * | 4/2003 | Prusik | B32B 7/06 374/E3.004 |
| 6,694,913 | B2 | * | 2/2004 | Cooperman | G01K 3/04 116/206 |
| 6,916,116 | B2 | * | 7/2005 | Diekmann | G01K 3/04 116/216 |
| 7,682,830 | B2 | * | 3/2010 | Prusik | G01N 31/229 116/216 |
| 7,940,605 | B2 | * | 5/2011 | Ambrozy | G01K 3/04 116/200 |
| 8,077,554 | B2 | * | 12/2011 | Ambrozy | G01K 3/04 116/200 |
| 8,166,906 | B2 | * | 5/2012 | Ambrozy | G01K 3/04 116/206 |
| 8,619,507 | B2 | * | 12/2013 | Ambrozy | G01K 3/04 116/200 |
| 9,063,015 | B2 | * | 6/2015 | Ambrozy | G01K 3/04 |
| 9,182,292 | B2 | * | 11/2015 | Ambrozy | G01K 3/04 |
| 10,031,086 | B2 | * | 7/2018 | Prusik | G01K 11/12 |
| 10,323,989 | B2 | * | 6/2019 | Ribi | A47G 19/00 |
| 10,378,970 | B2 | * | 8/2019 | Diehn | G01K 1/08 |
| 10,514,340 | B2 | * | 12/2019 | Prusik | G01N 31/229 |
| 10,545,125 | B2 | * | 1/2020 | Prusik | G01K 3/04 |
| 2004/0253733 | A1 | * | 12/2004 | Prusik | G01N 31/229 436/2 |
| 2006/0262828 | A1 | * | 11/2006 | Ambrozy | G01K 3/04 374/17 |
| 2008/0110391 | A1 | * | 5/2008 | Taylor | G01K 11/06 116/216 |
| 2009/0010803 | A1 | * | 1/2009 | Ambrozy | G01K 3/04 422/400 |
| 2012/0079981 | A1 | * | 4/2012 | Huffman | G01K 3/04 116/207 |
| 2013/0239874 | A1 | * | 9/2013 | Smith | G01N 31/229 116/206 |
| 2013/0291785 | A1 | * | 11/2013 | Ambrozy | G01K 3/04 116/200 |
| 2014/0044609 | A1 | * | 2/2014 | Prusik | G01N 31/229 422/429 |
| 2015/0247760 | A1 | * | 9/2015 | Ambrozy | G01K 3/04 116/200 |
| 2015/0293027 | A1 | * | 10/2015 | Cipriano | G01N 21/78 422/402 |
| 2016/0245707 | A1 | * | 8/2016 | Cipriano | G01K 11/165 |
| 2017/0131249 | A1 | | 5/2017 | Han | |
| 2019/0316975 | A1 | * | 10/2019 | Tada | G01K 3/10 |
| 2019/0346316 | A1 | * | 11/2019 | Diehn | G01K 1/08 |
| 2019/0360874 | A1 | * | 11/2019 | Diehn | G01K 1/08 |

FOREIGN PATENT DOCUMENTS

| | | |
|---|---|---|
| JP | 59-188528 A | 10/1984 |
| JP | 7-286914 A | 10/1995 |
| JP | 10-287863 A | 10/1998 |
| KR | 10-1477030 B1 | 12/2014 |
| WO | WO 2013/170273 A2 | 11/2013 |

OTHER PUBLICATIONS

International Search Report (PCT/ISA/210) issued in PCT Application No. PCT/JP2016/052557 dated May 24, 2016 with English translation (Four (4) pages).
Japanese-language Written Opinion (PCT/ISA/237) issued in PCT Application No. PCT/JP2016/052557 dated May 24, 2016 (Three (3) pages).

\* cited by examiner

TEMPERATURE TRACEABLE INDICATOR AND METHOD FOR MANUFACTURING SAME

TECHNICAL FIELD

The present invention relates to: a temperature traceable indicator using a thermochromic marking ink irreversibly developing a color or changing a color at a temperature not lower than a preset temperature; and a method for manufacturing the temperature traceable indicator.

BACKGROUND ART

Various kinds of low storage temperatures such as the temperatures of refrigeration, cold storage, chilled storage, and freezing point storage are used in the logistics of commercial products such as pharmaceutical products and foods. If a temperature deviates from an appropriate management temperature while such a product is transported or stored, the arising problems are: the deterioration of drug efficiency in the case of a pharmaceutical product; and the deterioration of flavor or degeneration such as putrefaction or the like in the case of a food. The present invention relates to a thermochromic display device that develops an irreversible change when it is exposed to a prescribed temperature and can display a temperature history.

In order to solve the above problems, a thermochromic marking (temperature traceable indicator) generating irreversible change when it reaches a temperature not lower than a preset temperature is studied. Although the indicator does not develop a color as long as the storage temperature of a commercial product is lower than a preset temperature, the indicator develops a color at a temperature not lower than the preset temperature and the color does not disappear even when it is cooled again. As a result, the history showing that the temperature of a commercial product has exceeded a preset temperature remains and the history cannot be falsified. Problems in the temperature management of a commercial product can be clarified by collating the history with the degeneration of the commercial product and the like.

As such a marking, a thermochromic marking in which, when a temperature not lower than a certain temperature is reached, a color developing layer melts, touches a color former layer, and irreversibly develops a color is described in Patent Literature 1.

CITATION LIST

Patent Literature

Patent Literature 1: Japanese Unexamined Patent Application Publication No. Hei 10-287863

SUMMARY OF INVENTION

Technical Problem

The technology of Patent Literature 1 merely shows that an upper limit temperature of storage is exceeded by irreversible color development and there has been no idea of adding other information. If a coloring layer can include minute dots or the like, however, a color can be developed in the form of a sign or a character. As a result, it becomes possible to: not only know the management situation of a storage temperature by color development; but also insert information such as a factory name, a manufacturing number, and a manufacturing date in the manufacturing of a commercial product as hidden characters. Further, information such as a bar code or a matrix type two-dimensional code can also be printed and hence the management of logistics is facilitated by installing a reader to read them at a delivery site of a commercial product.

To that end, an object of the present invention is to provide a temperature traceable indicator capable of: not only displaying a temperature history; but also adding other additional information.

Solution to Problem

In order to solve the above problem, a temperature traceable indicator according to the present invention includes a substrate and a temperature indicating laminate arranged over the substrate, wherein the temperature indicating laminate has a coloring layer including a color former, a color developing layer including a color developer to induce color development of the color former, and a barrier layer arranged between the coloring layer and the color developing layer; and the barrier layer includes a barrier agent that is incompatible with the color developer, freezes at a first temperature, and develops a color by melting and allowing the color developer to diffuse into the coloring layer at a temperature exceeding a second temperature.

Advantageous Effects of Invention

The present invention makes it possible to provide a temperature traceable indicator capable of: not only displaying a temperature history; but also adding other additional information.

DESCRIPTION OF EMBODIMENTS

Figure 1:
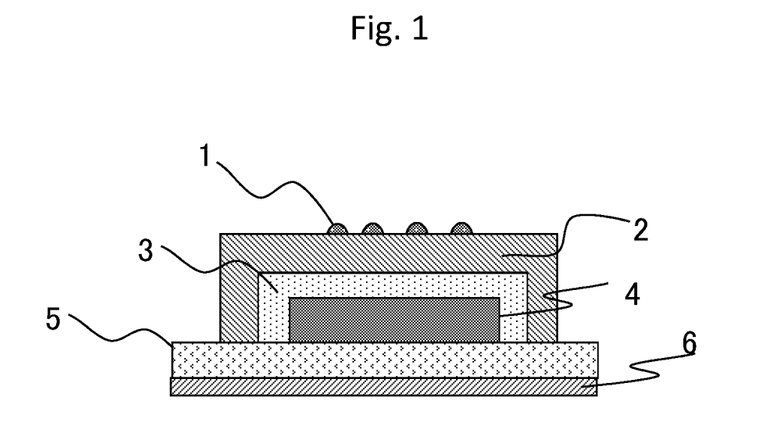
FIG. 1 is a sectional view of a temperature traceable indicator according to an embodiment of the present invention.

Embodiments according to the present invention are explained hereunder in reference to drawings. A temperature traceable indicator according to an embodiment of the present invention is shown in FIG. 1. The temperature traceable indicator includes a substrate 6 and a temperature indicating laminate arranged over the substrate 6. The temperature indicating laminate has a coloring layer including a color former 1 and printing paper 2, a barrier layer 3, and a color developing layer 4. The barrier layer 3 is arranged between the coloring layer and the color developing layer 4. The color developing layer 4 includes a color developer to induce color development of the color former and a carrier and the barrier layer 3 includes a barrier agent incompatible with the color developer and a carrier.

Figure 2:
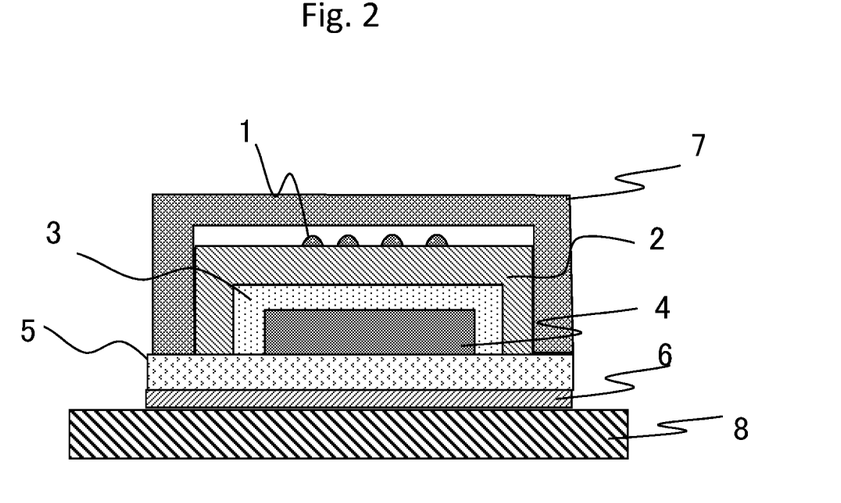
FIG. 2 is a sectional view of a temperature traceable indicator at a first temperature.
Figure 3:
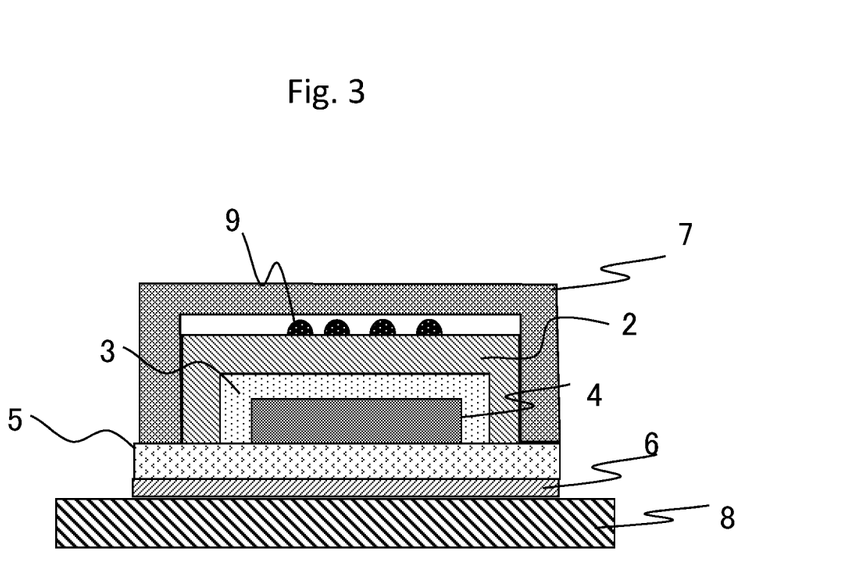
FIG. 3 is a sectional view of a temperature traceable indicator at a second temperature.

FIG. 2 is a sectional view of a temperature traceable indicator at a first temperature, and FIG. 3 is a sectional view of a temperature traceable indicator at a second temperature. A temperature traceable indicator shown in FIGS. 2 and 3 has a protective layer to protect a temperature indicating laminate. A barrier layer freezes at a first temperature and melts when a second temperature is reached. As a result, a color developer passes through the barrier layer and diffuses into a coloring layer and a color develops. In other words, when a management set temperature is exceeded, a barrier layer melts, a coloring layer touches a color developing layer, and a color develops. Within a management set temperature in contrast, a barrier agent constituting a barrier layer may desirably be incompatible with a color developer constituting a color developing layer so that the barrier layer may prevent the diffusion of the color developer. By adopting such a configuration, a temperature traceable indicator that irreversibly develops a color when a management set temperature is exceeded can be obtained.

Further, a temperature traceable indicator according to the present invention can use printing paper over which printing information used in logistics management is printed with an ink-jet printer as a coloring layer. Consequently, not only a temperature history but also other additional information can be added to the temperature traceable indicator. Moreover, printing information can be printed at an arbitrary environmental temperature and hence a temperature traceable indicator can be manufactured easily.

Meanwhile, in a temperature traceable indicator disclosed in Patent Literature 1, a thermometric layer constituting an element is set in the state of "switch-on" by being cooled to a temperature not higher than a critical temperature and the temperature history of a management object is traced in this state. By this method, an element is once cooled from a management set temperature and is in the state of "switch-on", and hence a pharmaceutical product or the like may undesirably degenerate. On the other hand, a temperature traceable indicator according to the present invention is not required to cool an element and produce the state of "switch-on". As a result, handling in a temperature range significantly deviating from a management set temperature can be avoided, hence the degeneration of a management object can be prevented, and the handling can be facilitated more.

Further, it is also possible to control time after a management set temperature is exceeded until a color develops by adjusting the thickness of printing paper.

Furthermore, the area of a coloring layer may desirably be larger than the area of a barrier layer. By increasing the area of a coloring layer so as to be larger than the area of a barrier layer, printing paper included in the coloring layer can absorb a barrier agent efficiently when the barrier layer melts.

Figure 4:
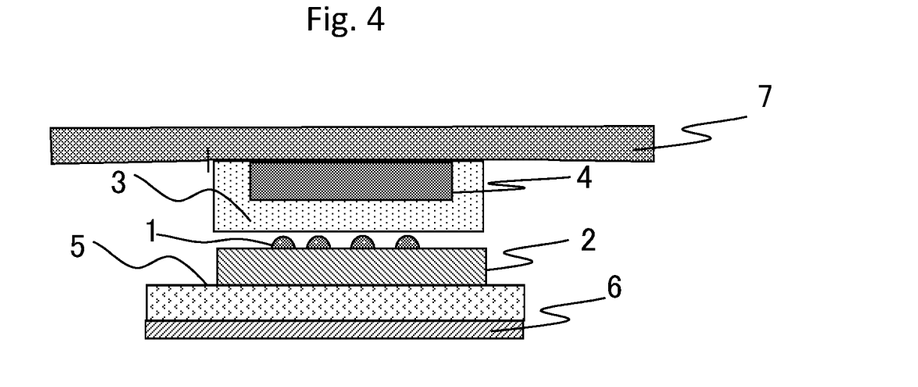
FIG. 4 is a sectional view of a temperature traceable indicator according to an embodiment of the present invention.
Figure 5:
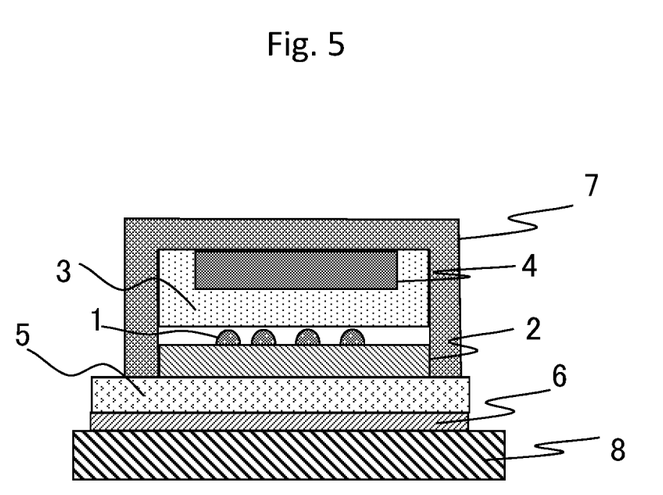
FIG. 5 is a sectional view of a temperature traceable indicator at a first temperature.
Figure 6:
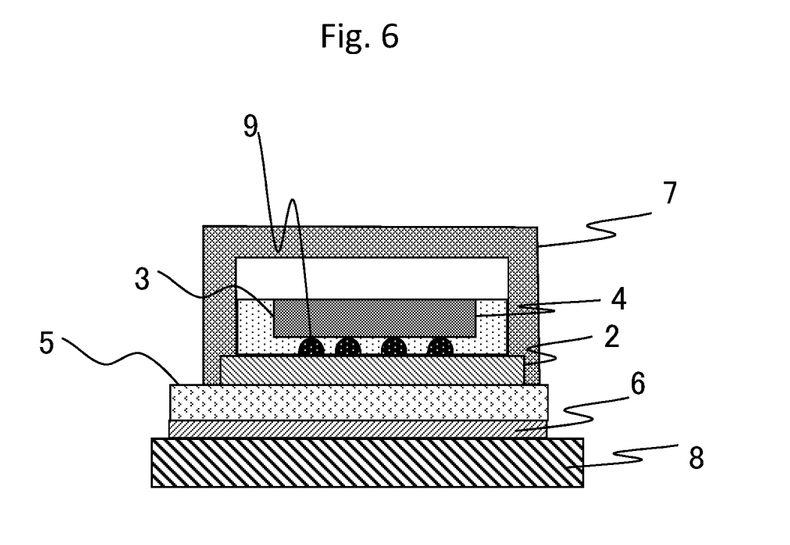
FIG. 6 is a sectional view of a temperature traceable indicator at a second temperature.
Figure 7:
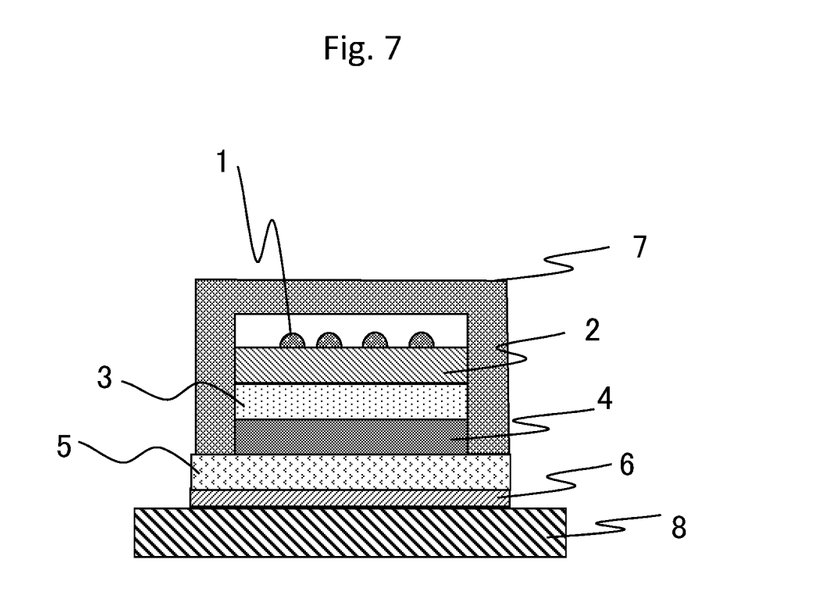
FIG. 7 is a sectional view of a temperature traceable indicator according to an embodiment of the present invention.

Although a temperature traceable indicator in FIGS. 1 to 3 has a temperature indicating laminate formed by stacking a color developing layer, a barrier layer, and a coloring layer in this order from a substrate side, a temperature traceable indicator having a temperature indicating laminate formed by stacking a coloring layer, a barrier layer, and a color developing layer in this order from a substrate side as shown in FIGS. 4 to 6 may also be acceptable. In a temperature traceable indicator in FIGS. 1 to 3, a color developer diffuses from the back side of a printing surface. In a temperature traceable indicator in FIGS. 4 to 6 in contrast, a color developer diffuses from the front side of a printing surface. In a temperature traceable indicator in FIGS. 4 to 6, in order to observe a printed character under a barrier layer and a color developing layer, carriers forming the barrier layer and the color developing layer are required to have such transparency as to be able to visually recognize a printed character under the layers. Further, in comparison with a temperature traceable indicator in FIGS. 1 to 3, time after a management set temperature is exceeded until a color changes is short in this configuration. Meanwhile, the time can be adjusted by changing the type of a carrier (barrier agent impregnated paper) contained in a barrier layer and the quantity of an impregnated barrier agent. As shown in FIG. 6, a printed character colored by exceeding a management set temperature can be observed through a protective layer, a color developing layer, and a barrier layer. Here, although a color developing layer is covered with a barrier layer in the configuration of FIGS. 1 to 6, a color developing layer may not be covered with a barrier layer as shown in FIG. 7.

Figure 8:
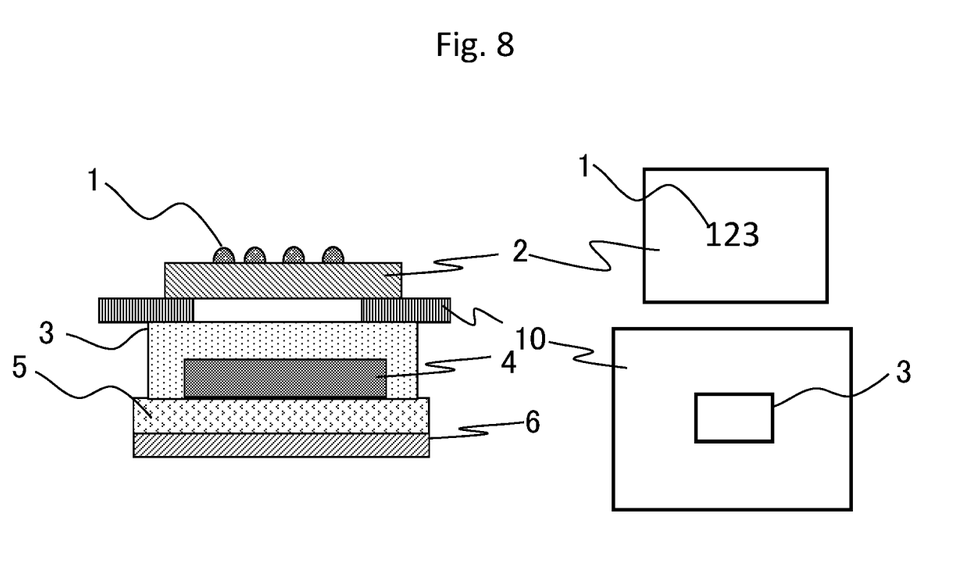
FIG. 8 is a view showing the cross sectional structure of a temperature traceable indicator and the relationship between printing paper and a diffusion control layer according to an embodiment of the present invention.
Figure 9:
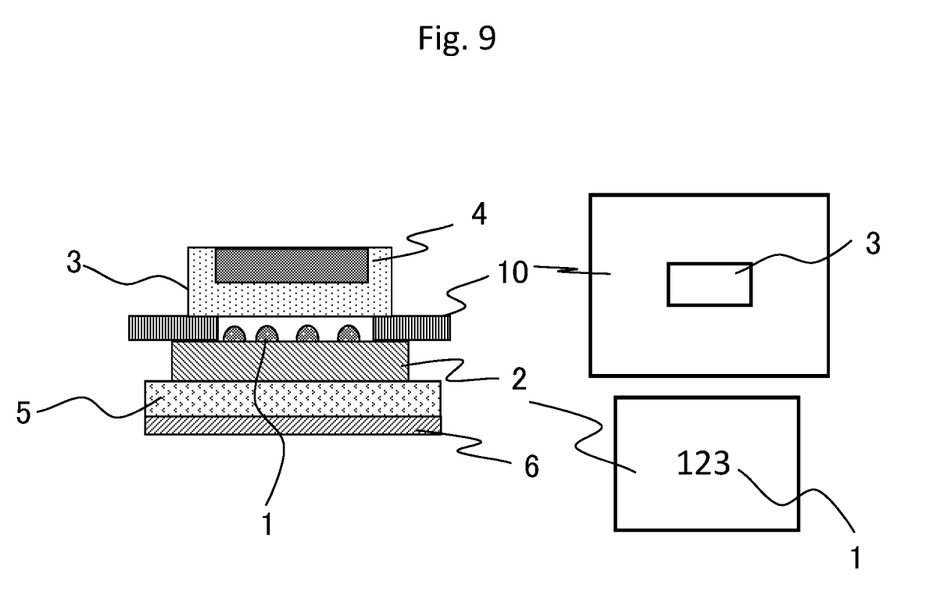
FIG. 9 is a view showing the cross sectional structure of a temperature traceable indicator and the relationship between printing paper and a diffusion control layer according to an embodiment of the present invention.

A temperature traceable indicator may have a diffusion control layer arranged between a barrier layer and a coloring layer. Temperature traceable indicators each of which has a diffusion control layer are shown in FIGS. 8 and 9. A diffusion control layer has an opening right under a region (hereunder referred to as a printing region) in which a color former in a coloring layer is printed. The size of the opening is desirably comparable with the printing region. The diffusion control layer inhibits a color developer from diffusing outside the printing region and prevents coloring failure of a printed character. Here, as a material of a diffusion control layer, an organic resin material insoluble in a color former, a barrier agent, a color developer, and solvents of them can be used. Further, PTFE, polyethylene, polydimethylsiloxane, and the like may also be applied beforehand to a region other than an expected printing region of printing paper.

Further, when a management set temperature is exceeded, firstly a barrier layer melts and shifts to printing paper. In order that a color developer shifts from a color developing layer to a coloring layer subsequently, the coloring layer, the barrier layer, and the color developing layer may desirably include continuously porous materials.

<Color Former>

As a color former, a material that is achromic or hypochromic visually but changes the structure by touching an acidic material or a basic material and develops or changes a color visually can be used. Here, a material that is nearly achromic or hypochromic in the vicinity of neutrality at a pH of about not less than 5 to less than 8 and develops or changes a color at a pH of about less than 5 is defined as a "material developing a color by touching an acidic material" and a material that develops or changes a color at a pH of about not less than 8 is defined as a "material developing a color by touching a basic material". Meanwhile, a chemical compound developing different colors in response to acidity, neutrality, and basicity exists in some materials and hence a material falling under both the categories of a "material developing a color by touching an acidic material" and a "material developing a color by touching a basic material" also exists. As "materials developing a color by touching an acidic material", methyl violet carbinol base, malachite green carbinol base, thymol blue, methyl yellow, methyl orange, and others are named. As "materials developing a color by touching a basic material", thymol blue, phenol red, phenolphthalein, naphtholphthalein, cresol red, alizarin yellow, thymolphthalein, bromophenol blue, bromothymol blue, and others are named. Among those materials, thymol blue, bromothymol blue, and bromothymol blue are desirable.

<Barrier Agent>

As a barrier agent, a structure that does not have an acidic group such as a carboxyl group, a sulfonic group, or a phenolic hydroxyl group or a basic group such as an amino group, each of which reacts with a color former, to the greatest possible extent is desirable. The reason is that there is the possibility that such an acidic group or a basic group reacts with a color former and the color former undesirably changes a color even when a barrier layer does not soften or melt.

As a barrier agent therefore, for example a long-chain hydrocarbon or a hydrocarbon having several branches, each of which does not contain an acidic group or a basic group, is desirable. Otherwise, an alcohol, a diol, or ketone, each of which has a long-chain hydrocarbon chain or a branched hydrocarbon chain, or an amide, an ether, an ester, or the like, each of which has a long-chain hydrocarbon chain or a branched hydrocarbon chain, can be used. As hydrocarbons each of which comprises a long-chain or branched hydrocarbon chain or a cyclic hydrocarbon chain, named are decane (−30° C.), 2-methylnonane (46° C.), cyclodecane (9° C.), dodecane (−12° C.), tetradecane (6° C.), hexadecane (17° C.), octadecane (28° C.), and others. Here, the expressions in the parentheses are melting points. As alcohols or diols each of which has a hydroxyl group at an end, 1,3-propanediol (−59° C.), 1,4-butanediol (20° C.), 1,6-hexanediol (40° C.), 1,2-octanediol (37° C.), 1-octanol (−16° C.), 1-decanol (6° C.), 1-dodecanol (24° C.), 1,2-dodecanediol (58° C.), 1,12-dodecanediol (82° C.), 5,6-dodecanediol (47° C.), 1-tetradecanol (38° C.), 2-tetradecanol (34° C.), 7-tetradecanol (42° C.), 1-hexadecanol (50° C.), and others are named. As materials each of which has a ketone structure, 2-octanone (−16° C.), 3-octanone (−23° C.), 2-decanone (3° C.), 2-dodecanone (−20° C.), 3-dodecanone (−19° C.), 2-tetradecanone (35° C.), 3-tetradecanone (34° C.), 3-hexadecanone (43° C.), propiophenone (18° C.), butyrophenone (12° C.), isobutyrophenone (1° C.), hexanophenone (26° C.), octanophenone (22° C.), decanophenone (35° C.), dodecanophenone (45° C.), tetradecanophenone (53° C.), hexadecanophenone (59° C.), and others are named. Among those, isopropyl palmitate, isopropyl myristate, and pentadecane are used desirably.

A barrier agent is selected variously in accordance with the upper limit of a management set temperature of a commercial product to be marked. In the case of a cold-stored product for example, the upper limit temperature is around 8° C. and hence a chemical compound such as tetradodecane or 1-decanol having a melting point of 6° C. is used desirably. In the case of a frozen food further, the upper limit of a management set temperature is around −16° C. and hence a chemical compound such as 1-octanol or 2-octanone having a melting point of −16° C. is used desirably.

<Color Developer>

A color developer is an acidic material or a basic material and is selected in conformity with a color former. As acidic materials, polymers each of which has a carboxyl group or a sulfonic group are named. Concretely, polyacrylic acid, polymethacrylic acid, polystyrene sulfonate, a copolymer of styrene and polyacrylic acid, a copolymer of methyl acrylate and acrylic acid, a copolymer of ethyl acrylate and acrylic acid, a copolymer of propyl acrylate and acrylic acid, a copolymer of butyl acrylate and acrylic acid, a copolymer of hexyl acrylate and acrylic acid, a copolymer of octyl acrylate and acrylic acid, a copolymer of methyl methacrylate and acrylic acid, a copolymer of ethyl methacrylate and acrylic acid, a copolymer of propyl methacrylate and acrylic acid, a copolymer of butyl methacrylate and acrylic acid, a copolymer of hexyl methacrylate and acrylic acid, a copolymer of octyl methacrylate and acrylic acid, a copolymer of styrene and polymethacrylic acid, a copolymer of methyl acrylate and methacrylic acid, a copolymer of ethyl acrylate and methacrylic acid, a copolymer of propyl acrylate and methacrylic acid, a copolymer of butyl acrylate and methacrylic acid, a copolymer of hexyl acrylate and methacrylic acid, a copolymer of octyl acrylate and methacrylic acid, a copolymer of methyl methacrylate and methacrylic acid, a copolymer of ethyl methacrylate and methacrylic acid, a copolymer of propyl methacrylate and methacrylic acid, a copolymer of butyl methacrylate and methacrylic acid, a copolymer of hexyl methacrylate and methacrylic acid, a copolymer of octyl methacrylate and methacrylic acid, a copolymer of styrene and styrene sulfonate, a copolymer of methyl acrylate and styrene sulfonate, a copolymer of ethyl acrylate and styrene sulfonate, a copolymer of propyl acrylate and styrene sulfonate, a copolymer of butyl acrylate and styrene sulfonate, a copolymer of hexyl acrylate and styrene sulfonate, a copolymer of octyl acrylate and styrene sulfonate, a copolymer of methyl methacrylate and styrene sulfonate, a copolymer of ethyl methacrylate and styrene sulfonate, a copolymer of propyl methacrylate and styrene sulfonate, a copolymer of butyl methacrylate and styrene sulfonate, a copolymer of hexyl methacrylate and styrene sulfonate, a copolymer of octyl methacrylate and styrene sulfonate, polyaspartic acid, polyglutamic acid, polyvinyl phenol, and others are named. As basic materials, polymers each of which has an amino group such as polyethyleneimine, polyallylamine, chitosan, polylysine, polyarginine, polyaniline, and others are named. Among those materials, polyacrylic acid, polyallylamine, and polyethyleneimine are desirable.

In the present invention, a color developer reacts with a color former by liquidly diffusing into a coloring layer. Consequently, a color developer may be used by being dissolved in a solvent such as water or ethanol. A solvent used can be selected in response to a management temperature to be set. For example, water may desirably be used as a solvent in temperature traceability of cold storage and ethanol may desirably be used as a solvent in frozen storage.

<Substrate>

Attachment to a commercial product can be facilitated by forming a temperature indicating laminate over a substrate. As a substrate, a film that is less expensive and has high durability to various organic solvents such as polyethylene is desirable. Further, polyethylene terephthalate (hereunder abbreviated as PET) is appropriate because it is excellent in low-temperature durability and is likely to give adhesiveness and transparency.

Further, a substrate may desirably have an adhesive layer over the rear surface. An adhesive layer makes it easy to attach a temperature traceable indicator to a management object.

<Protective Layer>

A temperature traceable indicator may have a protective layer covering a temperature indicating laminate in order to improve the printing durability of the temperature indicating laminate. A protective layer is desirably transparent so that printing and color development of printing may be confirmed visually. A protective layer may not be transparent as long as printing and color development of it can be recognized visually. Further, a substance that has durability to a low temperature and is insoluble in a color former, a color developer, a barrier agent, and solvents of them, those constituting a temperature indicating laminate, has to be selected. A PET film is appropriate as a material satisfying those requirements.

<Printing Paper>

In a temperature indicating laminate according to the present invention, when a management set temperature is exceeded, a barrier layer melts and a barrier agent and a color developer diffuse into printing paper. For that reason, bleeding in printing caused by the barrier agent and the color developer is concerned. As printing paper therefore, a material that is excellent in diffusivity in the thickness direction of the paper and hardly diffuses in the planar direction is desirable. For example, ink-jet printing paper having less bleeding in printing is desirable. Ink-jet printing paper is filled with an inorganic substance such as talc or calcium carbonate in the thickness direction of the paper. Consequently, since a liquid tends to diffuse more in the thickness direction than in the planar direction, bleeding in printing can be inhibited. Further, the time of contact between a color developer and a color former extends in response to the thickness of printing paper and the time from deviation from a set temperature to color development can be controlled.

<Barrier Agent Impregnated Paper>

A carrier (barrier agent impregnated paper) included in a barrier layer may be any material as long as the material dose not hinder a barrier agent from shifting from a barrier layer and a color developer from diffusing into a coloring layer. Barrier agent impregnated paper therefore may desirably be tissue paper having a small amount of an additive such as a filler, unlike printing paper. Further, a material that less retains the liquid of a barrier agent is used more desirably. The purpose is to minimize the quantity of a used barrier agent because a barrier layer diffusing into printing paper washes away a printing ink. Furthermore, in the case of a temperature traceable indicator shown in FIG. 4, barrier agent impregnated paper may desirably be transparent or translucent because a printed character under a barrier layer has to be recognized visually.

<Color Developer Impregnated Paper>

A carrier (color developer impregnated paper) included in a color developing layer may be any material as long as the material can retain a color developer of an amount sufficient for a color former to develop a color and ordinary paper can be used. In the case of a temperature traceable indicator shown in FIG. 4, color developer impregnated paper may desirably be transparent or translucent because a printed character under a color developing layer has to be recognized visually.

Meanwhile, when a material is used for the temperature traceability marking of a pharmaceutical product or a food, the safety of the material becomes important. That is, harmless to a human body is an important selection criterion.

<Manufacturing Method of Temperature Traceable Indicator>

A manufacturing method of a temperature traceable indicator is explained hereunder. A temperature traceable indicator according to the present invention uses a material incompatible with a color developer as a barrier agent because a barrier layer has to prevent the color developer from diffusing within a management set temperature. When a barrier layer is formed over an incompatible color developing layer, however, the color developing layer rejects the barrier agent at a coating process using a liquid and the barrier layer is hardly formed. A manufacturing method of a temperature traceable indicator according to the present invention therefore includes: a step of manufacturing a coloring layer by printing a color former over printing paper; a step of manufacturing a barrier layer by freezing after impregnating a barrier agent into a carrier; a step of manufacturing a color developing layer by freezing after impregnating a color developer into a carrier; and a step of stacking the coloring layer, the barrier layer, and the color developing layer so as to arrange the barrier layer between the coloring layer and the color developing layer. Concrete examples are explained below.

Firstly, a coloring layer is manufactured by being printed over a continuously porous body with a printer. A printer may be any printer as long as it can print by a thermo chromic ink that develops a color when a temperature changes, such as a demand-on-drop type (DOD type) ink-jet printer or a continuous type ink-jet printer. In view of printing and marking over a large number of commercial products, however, a continuous type ink-jet printer (CIJP) printable at a high speed is used desirably. By the above method, printing paper printed by a thermo chromic ink is obtained as a coloring layer. Successively, a barrier layer is manufactured by impregnating a barrier agent into a continuously porous body and a color developing layer is manufactured by impregnating a color developer into a continuously porous body. Successively, as shown in FIG. 1, after the color developing layer is arranged and frozen over a substrate tape having an adhesive layer, likewise the frozen barrier layer and moreover printing paper cooled to a temperature not higher than a set management temperature are stacked. Here, when a temperature traceable indicator having a temperature indicating laminate formed by stacking a coloring layer, a barrier layer, and a color developing layer in this order from a substrate side as shown in FIG. 4 is manufactured, the manufactured color developing layer and barrier layer may be stacked over the coloring layer arranged over a substrate after being adhered to a protective tape. Finally, a temperature traceable indicator is manufactured by covering the temperature indicating laminate with a protective film as shown in FIG. 2. The temperature traceable indicator is attached to a management object and used practically.

Embodiments according to the present invention are shown hereunder.

First Embodiment

<Manufacturing Method of Temperature Traceable Indicator>

Firstly, a thermo chromic ink (color former) changing a color in response to the change of a temperature was prepared through the following procedure. A thermo chromic ink was obtained by dissolving bromophenol blue (made by Wako Pure Chemical Industries, Ltd., 5 g) in ethanol (made by Wako Pure Chemical Industries, Ltd., 230 g) and further adding lithium nitrate (made by Wako Pure Chemical Industries, Ltd., 1.4 g) as an electrical conducting material. A coloring layer was formed by printing by the ink in a region of 5×10 mm in the center of ink-jet printer paper (0.3 mm in thickness, 10 mm in width, and 20 mm in length) with a continuous type ink-jet printer PX—R type made by Hitachi Industrial Equipment Systems Co., Ltd.

Successively, a color developer liquid was prepared by diluting a 30% polyethyleneimine aqueous solution (average molecular weight: about 70,000, made by Wako Pure Chemical Industries, Ltd., 2 g) by distilled water 20 g. A color developing layer was formed by cutting tracing paper of 40 g/m² to a size of 5 mm in width and 10 mm in length, impregnating the color developer liquid, and successively freezing in a freezer. The layer was arranged over a substrate tape comprising PET.

A barrier layer was formed by impregnating isopropyl myristate (made by Wako Pure Chemical Industries, Ltd.) into transparent paper 0.2 mm in thickness cut to a size of 6 mm in width and 11 mm in length and then freezing in a freezer.

The manufactured barrier layer was stacked over the color developing layer arranged over the substrate tape and further the coloring layer stored in the freezer was stacked as shown in FIG. 2. A temperature traceable indicator was manufactured by attaching a protective film over the laminate.

<Thermochromic Confirmatory Experiment>

A pharmaceutical product of a measuring object was stored in a thermostatic chamber set at 4° C. Successively, a temperature traceable indicator of a frozen state was put into the thermostatic chamber and the temperature traceable indicator was attached to a paper package of the pharmaceutical product by an adhesive layer over the rear surface of a substrate tape.

In order to observe the process of temperature change of the paper package of the pharmaceutical product to which the temperature traceable indicator is attached, the temperature was changed from 2° C. to 9° C. while a set temperature and the temperature in the chamber were monitored with the thermostatic chamber and a resistance temperature detector. At the beginning, the package was stored in the thermostatic chamber at 4° C. for 24 hours but the temperature traceable indicator did not change. Successively, the temperature traceable indicator did not change up to a set temperature of 8° C. but a melting barrier agent appeared over printing paper at 9° C. and an ink started to change the color from yellow to blue after the lapse of 7 minutes. Further, the color change of a printed character was completed after the lapse of 15 more minutes. Although the set temperature was returned to 4° C. again, the printed character remained blue. Successively, the temperature traceable indicator was taken out from the thermostatic chamber and analyzed and resultantly it was confirmed that the barrier layer melted and diffused into the printing paper and further the color developer touched the printing ink that was the color former and develops the color.

Second Embodiment

A temperature traceable indicator was manufactured similarly to the first embodiment except that a coloring layer, a barrier layer, and a color developing layer were arranged as shown in FIG. 5 and thermochromic confirmatory experiment was carried out.

A package was stored in a thermostatic chamber at 4° C. for 24 hours but a temperature traceable indicator did not change. Successively, the temperature traceable indicator did not change up to a set temperature of 8° C. but a melting barrier agent appeared over printing paper at 9° C. and an ink started to change the color from yellow to blue after the lapse of 1 minute. Further, the color change of a printed character was completed after the lapse of 8 more minutes. Although the set temperature was returned to 4° C. again, the printed character remained blue. Successively, the temperature traceable indicator was taken out from the thermostatic chamber and analyzed and resultantly it was confirmed that the barrier layer melted and diffused into the printing paper and further the color developer touched the printing ink that was the color former and developed the color.

Comparative Example 1

A temperature traceable indicator was manufactured similarly to the first embodiment except that a coating process using a liquid was adopted when a barrier layer was formed over an incompatible color developing layer. The details of the coating process using a liquid are described below. After a color developer was applied over a PET protective film that was a substrate by spin coating, a color developing layer was formed over the PET protective film by being dried at 60° C. for 30 minutes. A barrier agent similar to the first embodiment was applied over it by spin coating but a uniform coating film could not be formed. From the result, it was confirmed that, when a barrier layer was formed over an incompatible color developing layer, the color developing layer rejected a barrier agent undesirably at a process using a liquid and a barrier layer was hardly formed.

Third Embodiment

A temperature traceable indicator was manufactured similarly to the first embodiment except that a diffusion control layer of a PET film that had a thickness of 0.2 mm, was cut to 8×18 mm, and had an opening of 5×10 mm in the center part was arranged between a barrier layer and a color developing coloring layer as shown in FIG. 8 and a thermochromic experiment was carried out. A colored character of less bleeding in printing in comparison with the first embodiment was obtained.

Fourth Embodiment

A temperature traceable indicator was manufactured similarly to the second embodiment except that a diffusion control layer of a PET film that had a thickness of 0.2 mm, was cut to 8×18 mm, and had an opening of 5×10 mm in the center part was arranged between a barrier layer and a color developing coloring layer as shown in FIG. 9, and a thermochromic experiment was carried out. A colored character of less bleeding in printing in comparison with the second embodiment was obtained.

Fifth Embodiment

A temperature traceable indicator was manufactured similarly to the first embodiment except that a color former was printed after a polydimethylsiloxane solution was applied to printing paper with a printing region masked beforehand when a coloring layer was manufactured, and a thermochromic experiment was carried out. A result similar to the third embodiment was obtained.

Sixth Embodiment

A temperature traceable indicator was manufactured similarly to the second embodiment except that a color former was printed after a polydimethylsiloxane solution was applied to printing paper with a printing region masked beforehand when a coloring layer was manufactured, and a thermochromic experiment was carried out. A result similar to the fourth embodiment was obtained.

From the fifth embodiment and the sixth embodiment, it was found that a layer formed by applying PTFE, polyethylene, polydimethylsiloxane, or the like beforehand in a region other than a printing region over printing paper could be used as a diffusion control layer.

Seventh Embodiment

A temperature traceable indicator was manufactured similarly to the first embodiment except that a thermo chromic ink obtained by dissolving bromothymol blue (made by Wako Pure Chemical Industries, Ltd., 6 g) into ethanol (made by Wako Pure Chemical Industries, Ltd., 230 g) as a color former and moreover adding lithium nitrate (made by Wako Pure Chemical Industries, Ltd., 1.5 g) as an electrical conducting material was used, and a thermochromic confirmatory experiment was carried out.

The temperature traceable indicator was stored in a thermostatic chamber at 4° C. for 24 hours but did not change. Successively, the temperature traceable indicator did not change up to a set temperature of 8° C. but a melting barrier agent appeared over printing paper at 9° C. and an ink started to change the color from yellow to blue after the lapse of 6 minutes. Further, the color change of a printed character was completed after the lapse of 14 more minutes. Although the set temperature was returned to 4° C. again, the printed character remained blue. Successively, a temperature traceable indicator was taken out from the thermostatic chamber and analyzed and resultantly it was confirmed that the barrier layer melted and diffused into the printing paper and further the color developer touched the printing ink that was the color former and developed the color.

Eighth Embodiment

A temperature traceable indicator was manufactured similarly to the first embodiment except that a thermo chromic ink obtained by dissolving thymolphthalein (made by Wako Pure Chemical Industries, Ltd., 5.5 g) into ethanol (made by Wako Pure Chemical Industries, Ltd., 225 g) as a color former and moreover adding lithium nitrate (made by Wako Pure Chemical Industries, Ltd., 1.6 g) as an electrical conducting material was used, and a thermochromic confirmatory experiment was carried out.

The temperature traceable indicator was stored in a thermostatic chamber at 4° C. for 24 hours but did not change. Successively, the temperature traceable indicator did not change up to a set temperature of 8° C. but a melting barrier agent appeared over printing paper at 9° C. and an ink started to change the color from colorless to blue after the lapse of 8 minutes. Further, the color change of a printed character was completed after the lapse of 14 more minutes. Although the set temperature was returned to 4° C. again, the printed character remained blue. Successively, the temperature traceable indicator was taken out from the thermostatic chamber and analyzed and resultantly it was confirmed that the barrier layer melted and diffused into the printing paper and further the color developer touched the printing ink that was the color former and developed the color.

Ninth Embodiment

A temperature traceable indicator was manufactured by a method similar to the first embodiment except that pentadecane (made by Wako Pure Chemical Industries, Ltd.) was used as a barrier agent. Further, a thermochromic confirmatory experiment was carried out similarly to the first embodiment except that a set temperature was varied from 2° C. to 10° C.

The temperature traceable indicator was stored in a thermostatic chamber at 4° C. for 24 hours but did not change. Successively, the temperature traceable indicator did not change up to a set temperature of 8° C. but a melting barrier agent appeared over printing paper at 10° C. and an ink started to change the color from colorless to blue after the lapse of 8 minutes. Further, the color change of a printed character was completed after the lapse of 14 more minutes. Although the set temperature was returned to 4° C. again, the printed character remained blue. Successively, the temperature traceable indicator was taken out from the thermostatic chamber and analyzed and resultantly it was confirmed that the barrier layer melted and diffused into the printing paper and further the color developer touched the printing ink and developed the color.

Tenth Embodiment

A temperature traceable indicator was manufactured by a method similar to the first embodiment except that isopropyl palmitate (made by Wako Pure Chemical Industries, Ltd.) was used as a barrier agent. Further, a thermochromic confirmatory experiment was carried out similarly to the first embodiment except that a set temperature was varied from 2° C. to 12° C.

Firstly, the temperature traceable indicator was stored in a thermostatic chamber at 4° C. for 24 hours but did not change. Successively, the temperature traceable indicator did not change up to a set temperature of 11° C. but a melting barrier agent appeared over printing paper at 12° C. and an ink started to change the color from colorless to blue after the lapse of 9 minutes. Further, the color change of a printed character was completed after the lapse of 18 more minutes. Although the set temperature was returned to 4° C. again, the printed character remained blue. Successively, the temperature traceable indicator was taken out from the thermostatic chamber and analyzed and resultantly it was confirmed that the barrier layer melted and diffused into the printing paper and further the color developer touched the printing ink and developed the color.

In this way, it was confirmed that a temperature traceable indicator including a substrate and a temperature indicating laminate arranged over the substrate and being characterized in that the temperature indicating laminate had a coloring layer including a color former, a color developing layer including a color developer to induce color development of the color former, and a barrier layer arranged between the coloring layer and the color developing layer and the barrier layer included a barrier agent that was incompatible with the color developer, froze at a first temperature, and developed a color by melting and allowing the color developer to diffuse into the coloring layer at a temperature exceeding a second temperature did not change at a desired set temperature and changed a color at a temperature not lower than the set temperature. Further, it was clarified that a set temperature could be adjusted by selecting the type of a used barrier agent.

LIST OF REFERENCE SIGNS

1 Printed ink
2 Printing paper
3 Barrier layer
4 Color developing layer 5 Substrate tape
6 Adhesive layer
7 Protective film
8 Management object
9 Colored thermo chromic ink
10 Diffusion control layer

The invention claimed is:

1. A temperature traceable indicator comprising a substrate and a temperature indicating laminate arranged over the substrate,
   wherein the temperature indicating laminate has a coloring layer including a color former, a color developing layer including a color developer to induce color development of the color former, and a barrier layer arranged between the coloring layer and the color developing layer; and
   the barrier layer includes a barrier agent that is incompatible with the color developer, freezes at a first temperature, and develops a color by melting and allowing the color developer to diffuse into the coloring layer at a temperature exceeding a second temperature;
   wherein the temperature indicating laminate has a diffusion control layer between the barrier layer and the coloring layer; and
   the diffusion control layer has an opening right under a region in which the color former in the coloring layer is printed.

2. The temperature traceable indicator according to claim 1,
   wherein the temperature indicating laminate is formed by stacking the color developing layer, the barrier layer, the diffusion control layer, and the coloring layer in this order from the substrate side.

3. The temperature traceable indicator according to claim 1,
   wherein the temperature indicating laminate is formed by stacking the coloring layer, the diffusion control layer, the barrier layer, and the color developing layer in this order from the substrate side.

4. The temperature traceable indicator according to claim 3,
   wherein the color developing layer and the barrier layer include carriers; and
   the carriers are paper allowing a printed character under the color developing layer and the barrier layer to be visible.

5. The temperature traceable indicator according to claim 1,
   wherein the temperature traceable indicator has a protective layer to cover the temperature indicating laminate.

6. The temperature traceable indicator according to claim 1,
   wherein the area of the coloring layer is larger than the area of the barrier layer.

7. The temperature traceable indicator according to Claim 1,
   wherein the coloring layer includes printing paper; and
   the diffusion control layer is formed by applying a resin insoluble in the barrier agent and the color developer over printing paper excluding a region right under a region in which the color former in the coloring layer is printed.

8. The temperature traceable indicator according to claim 1,
   wherein the coloring layer, the color developing layer, and the barrier layer each include a continuously porous body.

9. The temperature traceable indicator according to claim 1,
   wherein the coloring layer is formed by printing the color former over printing paper; and
   the printing paper is filled with an inorganic material in a thickness direction.

10. The temperature traceable indicator according to claim 1,
    wherein the color developer is at least any of polyacrylic acid, polyallylamine, and polyethyleneimine.

11. The temperature traceable indicator according to claim 1,
    wherein the barrier agent is at least any of isopropyl palmitate, isopropyl myristate, and pentadecane.

12. The temperature traceable indicator according to claim 1,
    wherein the color former is at least any of thymol blue, bromothymol blue, and bromothymol blue.

13. A method for manufacturing a temperature traceable indicator including a substrate and a temperature indicating laminate arranged over the substrate, wherein the temperature indicating laminate has a coloring layer including a color former, a color developing layer including a color developer to induce color development of the color former, and a barrier layer arranged between the coloring layer and the color developing layer; and the barrier layer includes a barrier agent that is incompatible with the color developer, freezes at a first temperature, and develops a color by melting and allowing the color developer to diffuse into the coloring layer at a temperature exceeding a second temperature; wherein the temperature indicating laminate has a diffusion control layer between the barrier later and the coloring layer; and the diffusion layer has an opening right under a region in which the color former in the coloring layer is printed, the method comprising:
    a step of manufacturing the coloring layer by printing the color former over printing paper at room temperature;
    a step of manufacturing the barrier layer by freezing after impregnating the barrier agent into a carrier;
    a step of manufacturing the color developing layer by freezing after impregnating the color developer into a carrier; and
    a step of stacking the coloring layer, the barrier layer, and the color developing layer so as to arrange the barrier layer between the coloring layer and color developing layer.

* * * * *